United States Patent
Watarai et al.

(10) Patent No.: US 10,502,276 B2
(45) Date of Patent: Dec. 10, 2019

(54) ROTOR COVER

(71) Applicant: Shimano Inc., Sakai, Osaka (JP)

(72) Inventors: Etsuyoshi Watarai, Osaka (JP); Takashi Adachi, Osaka (JP); Yoshiaki Ando, Osaka (JP); Takafumi Nishino, Osaka (JP); Osamu Kariyama, Osaka (JP); Nobuyoshi Fujii, Osaka (JP); Masahiro Nakakura, Osaka (JP)

(73) Assignee: Shimano Inc., Osaka (JP)

( * ) Notice: Subject to any disclaimer, the term of this patent is extended or adjusted under 35 U.S.C. 154(b) by 80 days.

(21) Appl. No.: 15/635,028

(22) Filed: Jun. 27, 2017

(65) Prior Publication Data

US 2018/0010653 A1 Jan. 11, 2018

(30) Foreign Application Priority Data

Jul. 5, 2016 (JP) .................................. 2016-133509

(51) Int. Cl.
| | |
|---|---|
| *F16D 65/00* | (2006.01) |
| *B62L 1/00* | (2006.01) |
| *F16D 55/22* | (2006.01) |
| *F16D 65/12* | (2006.01) |
| *F16D 55/00* | (2006.01) |
| *F16D 65/02* | (2006.01) |

(52) U.S. Cl.
CPC .......... *F16D 65/0081* (2013.01); *B62L 1/005* (2013.01); *F16D 55/22* (2013.01); *F16D 65/0006* (2013.01); *F16D 65/12* (2013.01); *F16D 2055/0037* (2013.01); *F16D 2065/134* (2013.01); *F16D 2200/003* (2013.01)

(58) Field of Classification Search
CPC ................. F16D 65/0081; F16D 65/12; F16D 2055/0037; B62L 1/005
USPC ........................................ 188/218 A; 474/144
See application file for complete search history.

(56) References Cited

U.S. PATENT DOCUMENTS

| | | | | |
|---|---|---|---|---|
| 5,067,930 | A | * | 11/1991 | Morales .................... B62J 13/00 280/304.3 |
| 6,371,569 | B1 | * | 4/2002 | Dean ........................ B60B 7/061 188/218 A |
| 7,066,856 | B1 | * | 6/2006 | Rogers ..................... B62J 23/00 474/144 |
| 7,341,130 | B2 | * | 3/2008 | Samuelsson ............. F16D 55/00 188/218 A |
| 7,866,450 | B2 | * | 1/2011 | Nakamura .............. F16D 55/00 188/218 A |

(Continued)

FOREIGN PATENT DOCUMENTS

| | | | |
|---|---|---|---|
| DE | 202015101929 U1 | 6/2015 | |
| DE | 102014213156 A1 | * 1/2016 | ........... F16D 55/225 |

(Continued)

*Primary Examiner* — Thomas W Irvin
(74) *Attorney, Agent, or Firm* — Global IP Counselors, LLP

(57) ABSTRACT

A rotor cover is provided that includes different portions and is configured to meet requirements of each portion. The rotor cover includes a positioning portion that is positioned relative to a bicycle frame or a disc brake rotor and a cover portion that is coupled to the positioning portion to cover the disc brake rotor. The cover portion and the positioning portion include different materials with respect to one another.

19 Claims, 14 Drawing Sheets

(56) References Cited

U.S. PATENT DOCUMENTS

| | | | |
|---|---|---|---|
| 8,172,050 B2* | 5/2012 | Mikura | B62J 23/00 188/218 A |
| 8,235,849 B2* | 8/2012 | Cranston | B62J 13/00 280/261 |
| 8,491,429 B2* | 7/2013 | Cranston | B62J 13/00 280/304.3 |
| 9,422,993 B2* | 8/2016 | Watarai | F16D 65/12 |
| 9,797,461 B2* | 10/2017 | Morse | F16D 65/0081 |
| 9,903,427 B1* | 2/2018 | McGarry | F16D 65/005 |
| 9,915,306 B2* | 3/2018 | Koshiyama | F16D 65/0081 |
| 2005/0126868 A1* | 6/2005 | Lee | F16D 55/00 188/218 A |
| 2009/0194378 A1* | 8/2009 | Sand | F16D 55/00 188/73.47 |
| 2013/0077908 A1* | 3/2013 | Frantz | F16D 55/00 384/480 |
| 2016/0025162 A1* | 1/2016 | Morse | F16D 65/0081 188/218 A |
| 2017/0114843 A1* | 4/2017 | White | F16D 65/0081 |
| 2018/0003250 A1* | 1/2018 | Liu | F16D 65/00 |
| 2018/0010654 A1* | 1/2018 | Jimbo | F16D 55/00 |
| 2018/0010655 A1* | 1/2018 | Wen | B62J 23/00 |

FOREIGN PATENT DOCUMENTS

| | | | | |
|---|---|---|---|---|
| DE | 102015204527 A1 * | 9/2016 | | B60T 5/00 |
| EP | 2083186 A1 * | 7/2009 | | F16D 55/00 |

* cited by examiner

ROTOR COVER

CROSS-REFERENCE TO RELATED APPLICATIONS

This application claims priority to Japanese Patent Application No. 2016-133509, filed on Jul. 5, 2016. The entire disclosure of Japanese Patent Application No. 2016-133509 is hereby incorporated herein by reference.

BACKGROUND

Field of the Invention

The present invention generally relates to a rotor cover that covers a disc brake rotor, which is rotatable relative to a bicycle frame.

Background Information

German Utility Model Publication No. 202015101929 (Patent document 1) describes a rotor cover that includes a cover portion, which covers a disc brake rotor. The cover portion includes a central part that is supported by a hub of a bicycle.

SUMMARY

The rotor cover includes a plurality of portions, each of which has different required properties. However, this point is not considered in document 1. Thus, there is room for improvement.

One object of the present invention is to provide a rotor cover that includes different portions and is configured to meet requirements of each portion.

(1) In a first aspect of the invention, a rotor cover includes a positioning portion that is positioned relative to a bicycle frame or a disc brake rotor and a cover portion coupled to the positioning portion to cover the disc brake rotor. The cover portion and the positioning portion include different materials with respect to one another.

The positioning portion is required, for example, to have relatively high durability. The cover portion is required, for example, to include a light material to reduce the weight of the rotor cover. In the rotor cover of the first aspect, the materials of the positioning portion and the cover portion meet the requirements of each portion.

(2) in a second aspect of the invention, in the rotor cover according to the first aspect, the cover portion includes a resin material. Since the cover portion includes a resin material, the rotor cover of the second aspect is reduced in weight.

(3) In a third aspect of the invention, in the rotor cover according to any one of the preceding aspects, the positioning portion includes a metal material. Since the positioning portion includes a metal material, the rotor cover of the third aspect has relatively high durability.

(4) In a fourth aspect of the invention, in the rotor cover according to any one of the preceding aspects, the positioning portion includes an aluminum alloy material. Since the positioning portion includes an aluminum alloy material, the rotor cover of the fourth aspect is reduced in weight.

(5) In a fifth aspect of the invention, in the rotor cover according to any one of the preceding aspects, the cover portion is coupled to the positioning portion in a non-removable manner. The rotor cover of the fifth aspect limits separation of the cover portion from the positioning portion.

(6) In a sixth aspect of the invention, in the rotor cover according to any one of the preceding aspects, the cover portion is formed integrally with the positioning portion. The rotor cover of the sixth aspect eliminates the need of a member that couples the cover portion and the positioning portion, which are formed from different materials with respect to one another.

(7) In a seventh aspect of the invention, in the rotor cover according to any one of the preceding aspects, the cover portion is coupled to the positioning portion in a removable manner. The rotor cover of the seventh aspect allows the cover portion to be removed from the positioning portion.

(8) In an eighth aspect of the invention, in the rotor cover according to any one of the preceding aspects, the positioning portion is positioned relative to the bicycle frame to which a disc brake caliper is coupled. Since the rotor cover of the eighth aspect is fixed to the bicycle frame, the stability of the rotor cover is improved.

(9) in a ninth aspect of the invention, in the rotor cover according to any one of the preceding aspects, the positioning portion is supported by a bicycle hub so that the positioning portion is attachable and removable together with the bicycle hub with respect to the bicycle frame. In the rotor cover of the ninth aspect, the positioning portion is supported together with the bicycle hub. Thus, removal of the bicycle hub from the bicycle frame results in removal of the rotor cover from the bicycle frame.

(10) In a tenth aspect of the invention, in the rotor cover according to any one of the preceding aspects, the positioning portion includes an annular part through which a shaft member of the bicycle hub passes, and a coupling part extending from the annular part and coupled to the cover portion.

In the rotor cover of the tenth aspect, the extension of the shaft member of the bicycle hub through the annular part allows the rotor cover to be coupled to the bicycle frame at a portion corresponding to the center of the disc brake rotor.

(11) In an eleventh aspect of the invention, the cover according to any one of the preceding aspects further includes an attachment portion configured to be attached to at least one of the bicycle frame and the disc brake caliper. In the rotor cover of the eleventh aspect, the attachment portion limits loosing of the rotor cover relative to the bicycle frame.

(12) In a twelfth aspect of the invention, in the rotor cover according to any one of the preceding aspects, the attachment portion includes a band member attachable to the bicycle frame. In the rotor cover of the twelfth aspect, the band member is attached to the bicycle frame. In a case in which the rotor cover is used in various types of bicycle frames, loosing of the rotor cover is limited in an easy and ensured manner.

(13) In a thirteenth aspect of the invention, in the rotor cover according to any one of the preceding aspects, the attachment portion includes a clip member configured to hold the bicycle frame. In the rotor cover of the thirteenth aspect, the clip member holds the bicycle frame. In a case in which the rotor cover is used in various types of bicycle frames, loosing of the rotor cover is limited in an easy and ensured manner.

(14) In a fourteenth aspect of the invention, in the rotor cover according to any one of the preceding aspects, the cover portion includes a first edge facing at least one of the bicycle frame and the disc brake caliper. The first edge includes a restriction portion that extends in an axial direction of the disc brake rotor. The restriction portion is configured to be contactable with at least one of the bicycle frame and the disc brake caliper to restrict rotation of the rotor cover.

In the rotor cover of the fourteenth aspect, the restriction portion restricts rotation of the rotor cover by contacting at least one of the bicycle frame and the disc brake caliper. This facilitates the positioning of the rotor cover relative to the bicycle frame or the disc brake rotor.

(15) In a fifteenth aspect of the invention, in the rotor cover according to any one of the preceding aspects, the cover portion includes a second edge facing at least one of the bicycle frame and the disc brake caliper. The second edge includes a flexible portion that is bent by contacting at least one of the bicycle frame and the disc brake caliper.

In the rotor cover of the fifteenth aspect, in a state in which the rotor cover is positioned relative to at least one of the bicycle frame and the disc brake caliper, the flexible portion is bent. This generates stress in the flexible portion of the rotor cover and limits loosing of the rotor cover.

(16) In a sixteenth aspect of the invention, the rotor cover according to any one of the preceding aspects further includes an elastic portion configured to be contactable with the cover portion and at least one of the bicycle frame and the disc brake caliper.

In the rotor cover of the sixteenth aspect, in a state in which the rotor cover is positioned relative to at least one of the bicycle frame and the disc brake caliper, the elastic portion is elastically deformed. This generates stress in the elastic portion of the rotor cover and limits loosing of the cover.

(17) In a seventeenth aspect of the invention, the rotor cover according to any one of the preceding aspects further includes a vibration absorption member arranged on the cover portion. In the rotor cover of the seventeenth aspect, the vibration absorption member attenuates vibration of the rotor cover. Thus, loosing of the rotor cover is limited when the bicycle is traveling.

(18) In an eighteenth aspect of the invention, in the rotor cover according to any one of the preceding aspects, the cover portion includes a circumferential part at least partially covering a circumferential edge of the disc brake rotor at a radially outer side of the disc brake rotor, and a side surface part covering a side surface of the disc brake rotor that is opposite to a bicycle wheel. The circumferential part is thicker than the disc brake rotor.

In the rotor cover of the eighteenth aspect, the circumferential part is thicker than the disc brake rotor. This limits contact of an object with the disc brake rotor.

The rotor cover of the invention is configured to meet the requirements for each portion.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
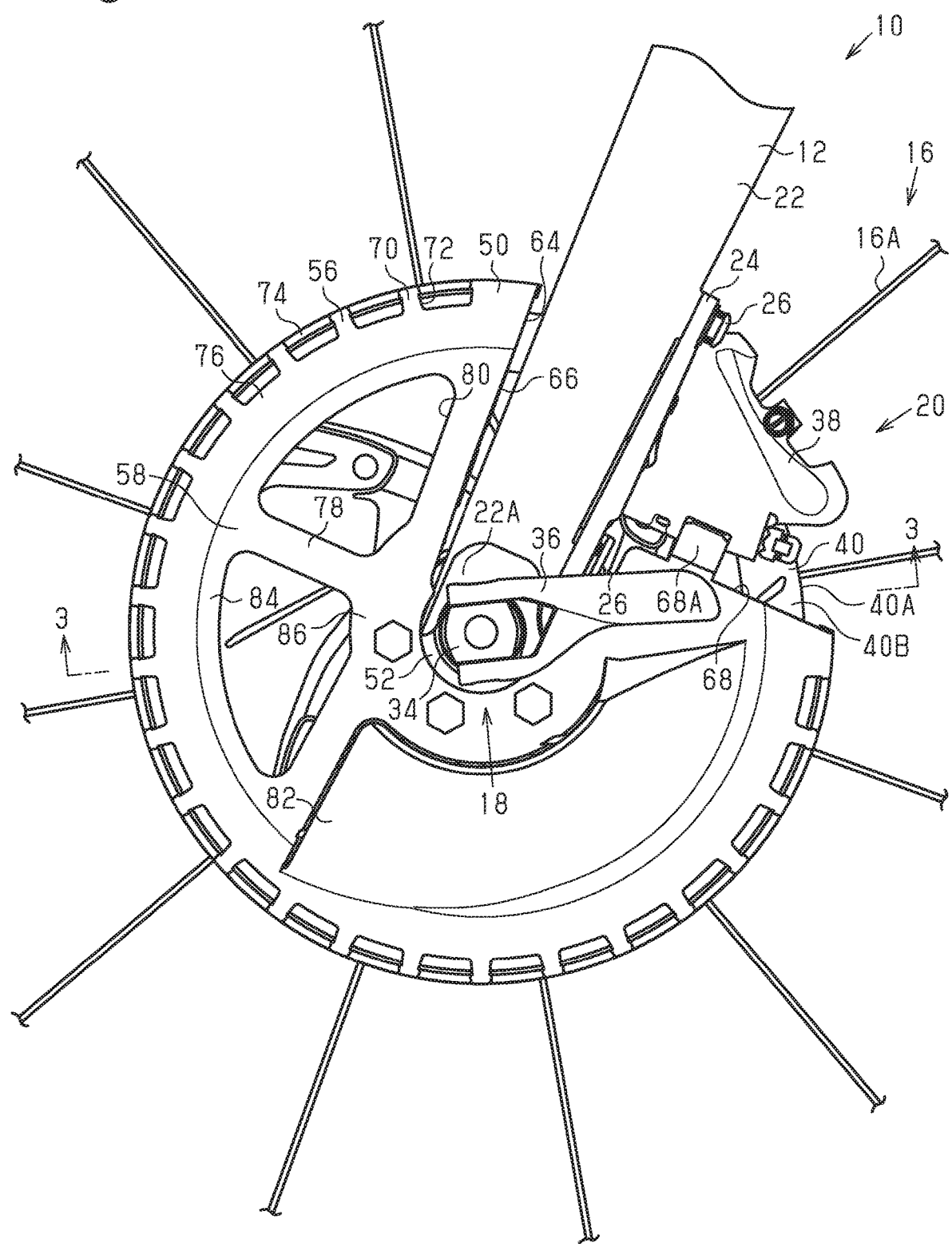
FIG. 1 is a side elevational view of a front portion of a bicycle that includes a disc brake, a rotor and a rotor cover in accordance with one embodiment.

A structure of a bicycle 10 to which a rotor cover 50 is coupled will now be described with reference to FIGS. 1 to 3. As shown in FIG. 1, the bicycle 10 includes a bicycle frame 12, a bicycle hub 14 (refer to FIG. 2) forming a center part of a bicycle wheel 16, an attachment mechanism 18 and a disc brake 20.

The bicycle frame 12 includes a frame body 22 and a mount portion 24. The frame body 22 includes an end 22A to which the bicycle hub 14 is coupled. The frame body 22 includes a front fork (not shown) and a support portion (not shown), which pivotally supports the front fork (not shown). The end 22A of the bicycle frame 12 defines a fork end of the front fork or a rear end of the support portion. The mount portion 24 is fastened by a pair of bolt members 26 to the frame body 22 at a position proximate to the end 22A. The mount portion 24 is a plate-shaped member.

Figure 2:
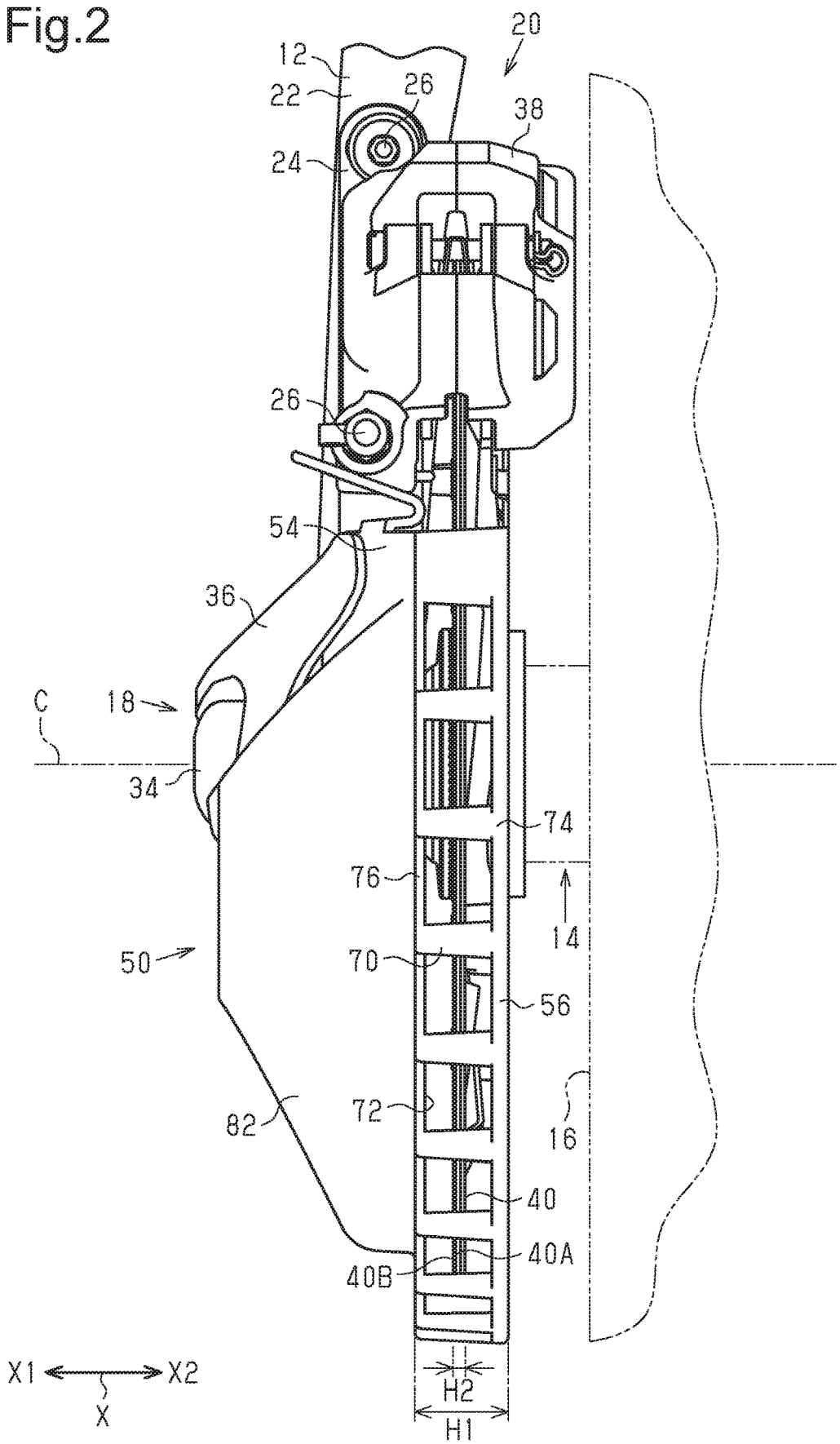
FIG. 2 is a rear view of a disc brake, the rotor and the rotor cover shown in FIG. 1.
Figure 3:
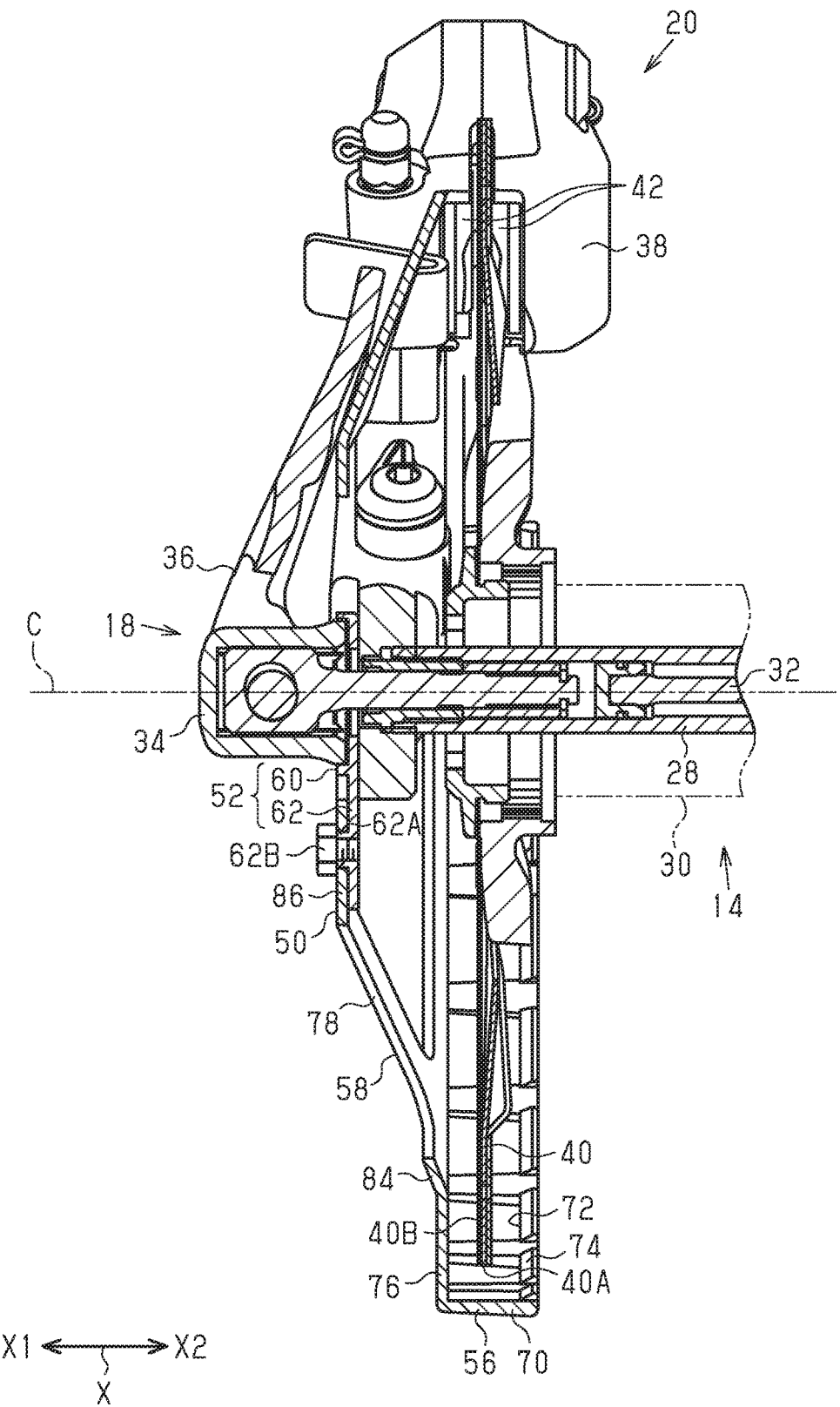
FIG. 3 is a cross-sectional view of the front portion of the bicycle taken along section line 3-3 in FIG. 1.

As shown in FIGS. 2 and 3, the bicycle hub 14 includes a hub axle 28 and a hub shell 30. The hub axle 28 is a hollow axle member. The hub axle 28 includes a circumferential portion to which the hub shell 30 is coupled so that the hub shell 30 is rotatable relative to the hub axle 28. The hub shell 30 includes a circumferential portion to which a plurality of spokes 16A of the bicycle wheel 16 are coupled.

The attachment mechanism 18 attaches the bicycle hub 14 to the bicycle frame 12 in a removable manner. The attachment mechanism 18 includes a shaft member 32, a head 34 and a lever 36. The shaft member 32 is inserted into the hub axle 28. The head 34 is coupled to an end of the shaft member 32. The lever 36 is coupled to the shaft member 32 by the head 34. In the attachment mechanism 18, the lever 36 is pivoted about the head 34 to move the head 34 in an axial direction of the hub axle 28. The attachment mechanism 18 attaches the hub axle 28 to the bicycle frame 12 by holding the end 22A of the bicycle frame 12 between the head 34 and the hub axle 28.

The disc brake 20 includes a disc brake caliper 38 (hereafter, simply referred to as "the caliper 38"), a disc brake rotor 40 (hereafter, simply referred to as "the rotor 40") and a pair of brake pads 42. The rotor 40 is rotatable relative to the bicycle frame 12. The rotor 40 is coupled to the hub shell 30 and rotated integrally with the hub shell 30. The rotor 40 includes a chamfered circumferential edge 40A. The circumferential edge 40A of the rotor 40 is corner-chamfered. In one example of chamfering, a chamfered portion has a dimension in the radial direction of the rotor 40 and a dimension in the axial direction of the rotor 40 that have a relationship included in 0.10/0.10 or greater and 0.40/0.20 or less. In another example, the circumferential edge 40A of the rotor 40 is rounded.

The caliper 38 is coupled to the bicycle frame 12. In particular, in the illustrated embodiment, the caliper 38 is coupled to the mount portion 24. As shown in FIG. 2, the rotor 40 is fitted into the recess of the caliper 38. The caliper 38 applies a braking force on the bicycle wheel 16 by holding the rotor 40 between the inner braking surfaces of the brake pads 42 (refer to FIG. 3) based on operation of an operation device (not shown). The disc brake 20 is moved by hydraulic pressure. In another example, the disc brake 20 is electrically moved.

The structure of the rotor cover 50 will now be described with reference to FIGS. 1 to 8. As shown in FIG. 1, the rotor cover 50 includes a positioning portion 52 and a cover portion 54. In one example, the rotor cover 50 further includes a circumferential part 56 and a side surface part 58. The rotor cover 50 covers the rotor 40. The rotor cover 50 has the form of a disc that is partially cut away. The rotor cover 50 has a larger diameter than the rotor 40. The rotor cover 50 is coupled to the bicycle frame 12. The rotor cover 50 is attached together with the hub axle 28 to the bicycle frame 12 by the attachment mechanism 18.

As shown in FIG. 3, the positioning portion 52 is positioned relative to the bicycle frame 12. The positioning portion 52 is supported by the bicycle hub 14 so that the positioning portion 52 is attachable and removable together with the bicycle hub 14 with respect to the bicycle frame 12. The positioning portion 52 includes a metal material. The positioning portion 52 includes an aluminum alloy material. In one example, a metal plate is stamped to form the positioning portion 52 as a one-piece member.

Figure 6:
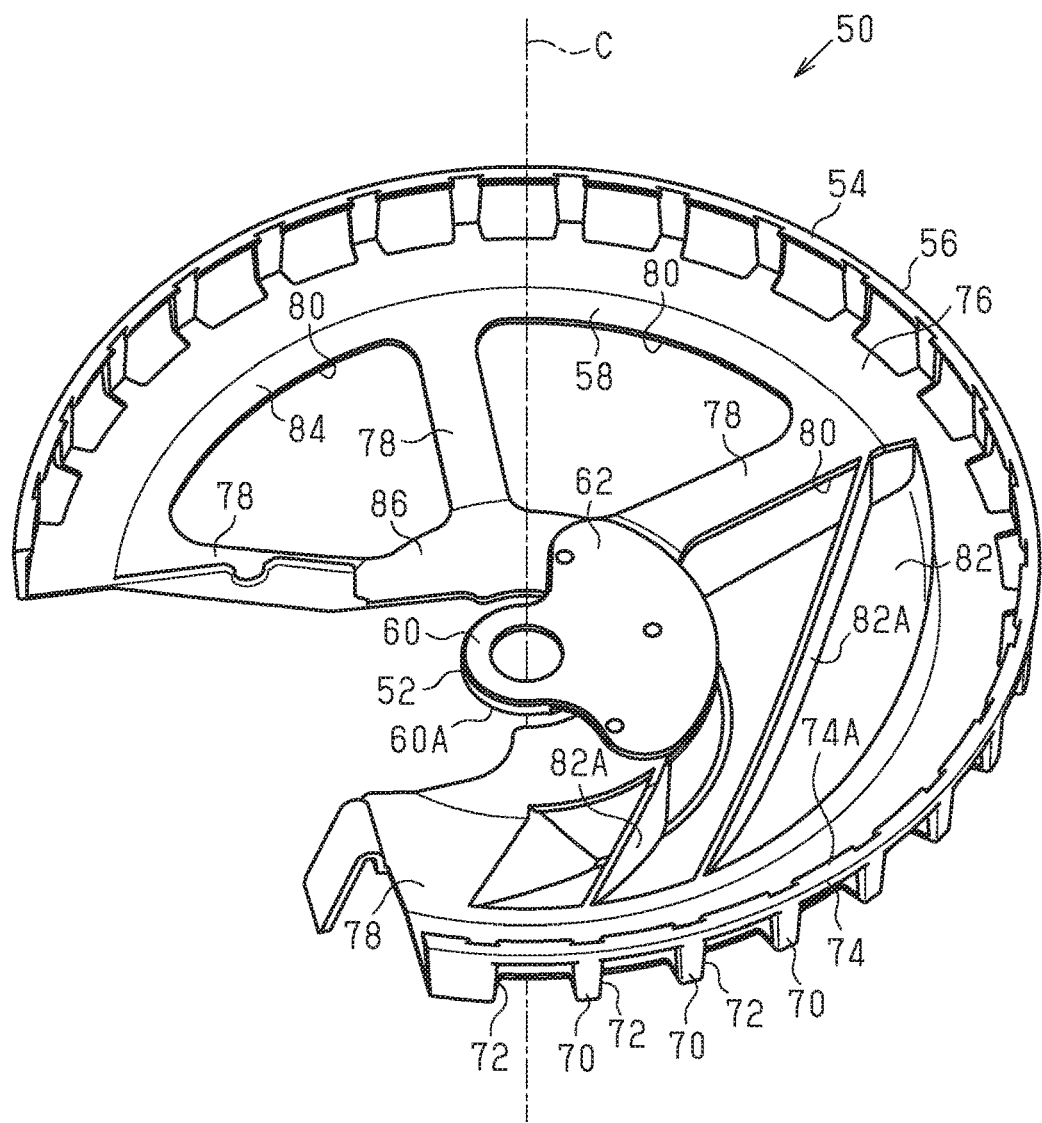
FIG. 6 is a perspective view of the rotor cover showing an inner side surface of the rotor cover shown in FIG. 1.
Figure 6:
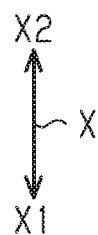

As shown in FIG. 6, the positioning portion 52 includes an annular part 60 and a coupling part 62. The annular part 60 has a center axis that is coincident to a center axis of the rotor cover 50 and a center rotational axis C of the rotor 40. The shaft member 32 (refer to FIG. 3) of the bicycle hub 14 extends through the annular part 60. The annular part 60 includes a circumferential portion 60A, which projects in an axial direction X of the rotor 40 extending from the bicycle wheel 16 toward the rotor cover 50 (hereafter, referred to as "a first direction X1"). As shown in FIG. 3. The annular part 60 is held between the head 34 and the end 22A of the bicycle frame 12. In a state in which the lever 36 of the attachment mechanism 18 is collapsed, movement of the annular part 60 is restricted relative to the bicycle frame 12.

As shown in FIG. 6, the coupling part 62 extends from the annular part 60. The coupling part 62 is coupled to the cover portion 54. It is preferred that the coupling part 62 circumferentially extends from one-quarter to one-half of the circumference of the annular part 60. Referring to FIG. 3, the coupling part 62 includes a plurality of projections 62A. The projections 62A project in the axial direction from a first side of the annular part 60 in the first direction X1. In other words, the coupling part 62 is arranged at an opposite side (the first side) of the annular part 60 with respect to the bicycle frame 12 in a direction in which the bicycle frame 12 extends. The coupling part 62 has a second side that faces in a second direction X2 of the axial direction X of the rotor 40.

The cover portion 54 is coupled to the positioning portion 52 to cover the rotor 40 (refer to FIG. 1). The cover portion 54 includes a material that differs from the material of the positioning portion 52. The cover portion 54 includes a resin material. The cover portion 54 is coupled to the positioning portion 52 in a removable manner. In particular, the cover portion 54 is removably coupled to the positioning portion 52 by a plurality of bolts 62B in reinstallable manner. The projections 62A each have an internal thread (not shown). In a state in which the bolts 62B are fastened to the internal threads of the projections 62A, the positioning portion 52 is coupled to the cover portion 54. The bolts 62B are screwed into the internal threads of the projections 62A from the first direction X1 to the second direction X2. The bolts 62B restrict the relative movement of the cover portion 54 and the positioning portion 52.

The cover portion 54 includes the circumferential part 56. In one example, the cover portion 54 further includes the side surface part 58, a cutaway part 64, a first edge 66 and a second edge 68. The cover portion 54 has the form of a disc that includes the cutaway part 64. As shown in FIG. 1, the bicycle frame 12 and the caliper 38 are fitted to the cutaway part 64.

The circumferential part 56 covers at least a portion of the circumferential edge 40A of the rotor 40 at a radially outer side of the rotor 40. The circumferential part 56 covers the circumferential edge 40A at portions where the bicycle frame 12 and the caliper 38 are not located. As shown in FIG. 2, a thickness H1 of the circumferential part 56 is greater than a thickness H2 of the rotor 40.

The circumferential part 56 includes a plurality of first pieces 70 and a plurality of first openings 72. The circumferential part 56 further includes a first connection piece 74. In one example, the circumferential part 56 further includes a second connection piece 76. The circumferential part 56 includes at least three of the first pieces 70.

The first pieces 70 face the circumferential edge 40A of the rotor 40. The first pieces 70 are arranged in a circumferential direction of the rotor 40. The first pieces 70 are arranged at a fixed interval in a circumferential direction of the rotor cover 50. Each of the first pieces 70 is rod-shaped, and has an overall L-shape. The second direction X2 is opposite to the first direction X1 in the axial direction X of the rotor 40. Each of the first pieces 70 includes a first portion located at a second side of the cover portion 54 that faces in the second direction X2, and extending in the second direction X2 of the axial direction X of the rotor 40.

Each of the first pieces 70 further includes a second portion inwardly bent from the first portion to extend in the radial direction of the rotor 40.

The first connection piece 74 is located closer to the bicycle wheel 16 than the rotor 40 in the axial direction X of the rotor 40. The first connection piece 74 connects adjacent ones of the first pieces 70. Thus, the first connection piece 74 connects the first pieces 70 at a position closer to the bicycle wheel 16 than the rotor 40 in the axial direction X of the rotor 40. The first connection piece 74 is rod-shaped, and extends in the circumferential direction of the rotor 40.

Figure 8:
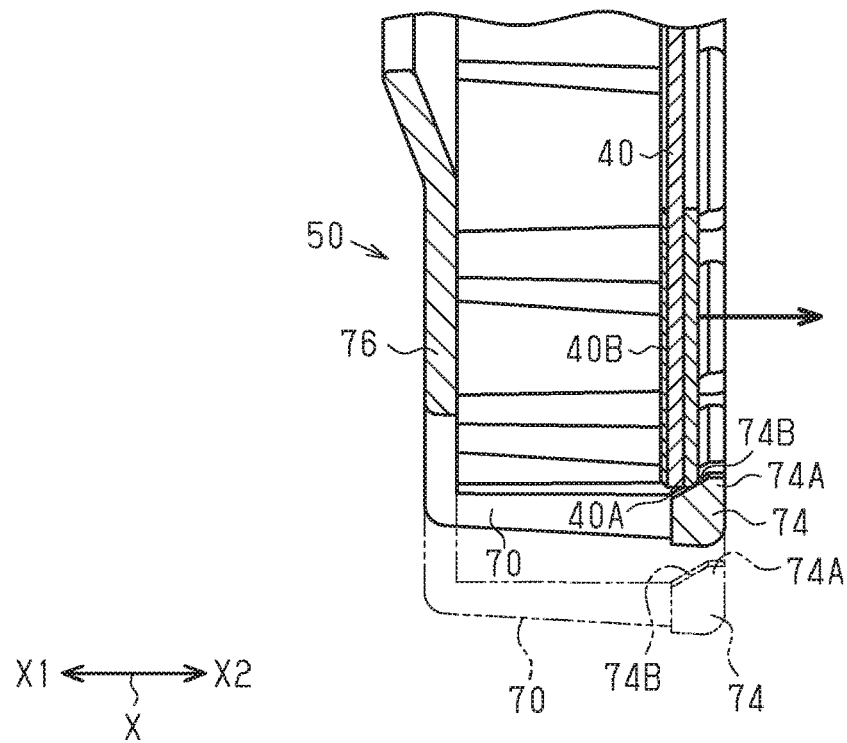
FIG. 8 is a partial cross-sectional diagram of the disc brake rotor and the rotor cover showing removal of the disc brake rotor from a bicycle frame shown in FIG. 1.

As shown in FIG. 6, the first connection piece 74 includes a plurality of projections 74A, which project toward the center rotational axis C of the rotor 40. The projections 74A are arranged between adjacent ones of the first pieces 70. Referring to FIG. 8, each of the projections 74A includes an inclined surface 74B, which is located closer to the rotor 40 in the axial direction X of the rotor 40. As the inclined surface 74B becomes closer to the center rotational axis C of the rotor 40. The inclined surface 74B is inclined from the rotor 40 (refer to FIG. 3) toward the bicycle wheel 16 (refer to FIG. 3).

Figure 5:
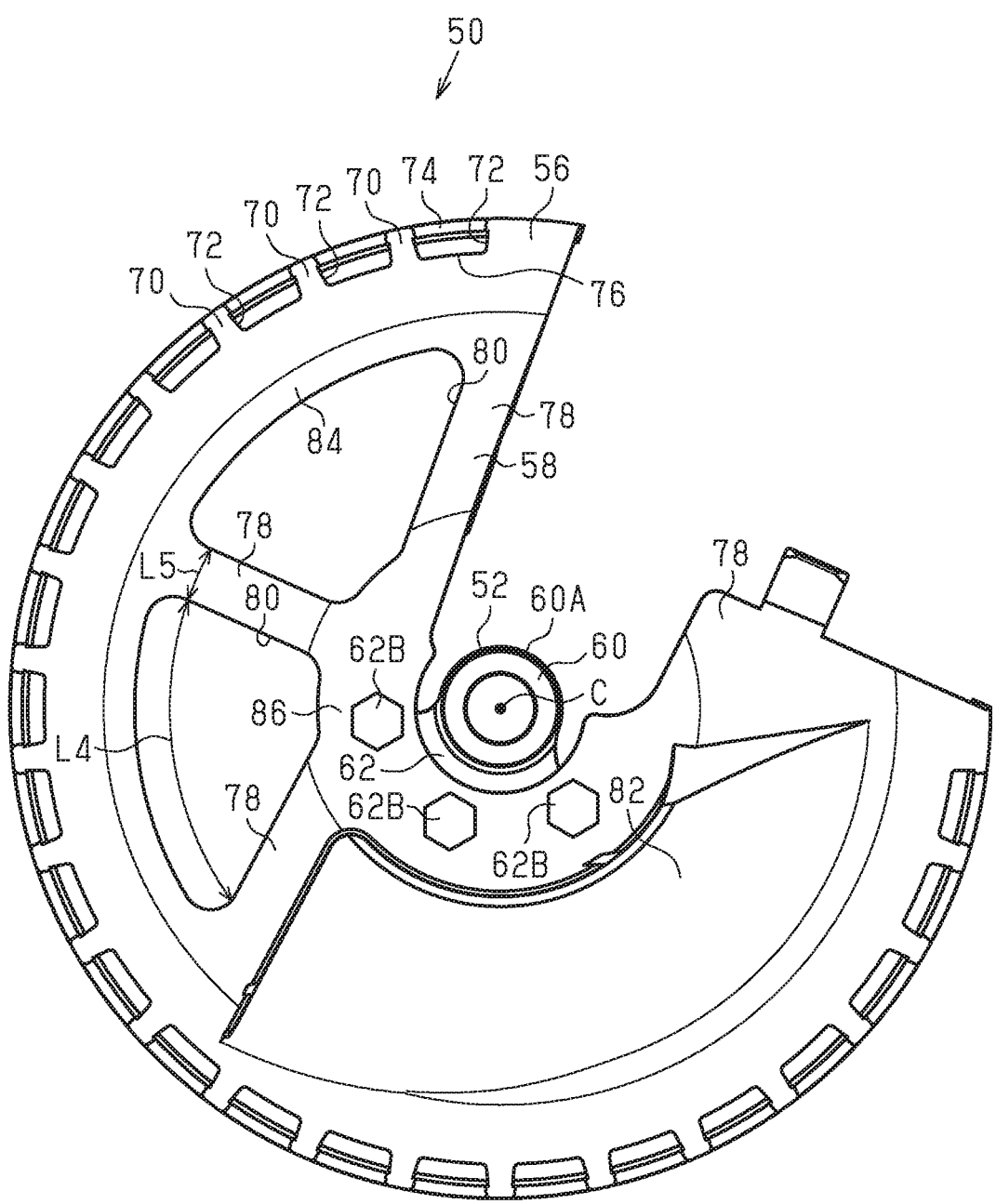
FIG. 5 is a side elevational view showing an outer side of the rotor cover shown in FIG. 1.

As shown in FIG. 5, the second connection piece 76 is arranged at a different location with respect to the first connecting piece 74 in the axial direction X of the rotor 40. The second connection piece 76 is connected to the first pieces 70. The second connection piece 76 is arranged at an opposite side of the rotor 40 with respect to the bicycle frame 10 in the axial direction X of the rotor 40. The second connection piece 76 has the form of a strip that extends in the radial direction of the rotor 40.

Figure 7:
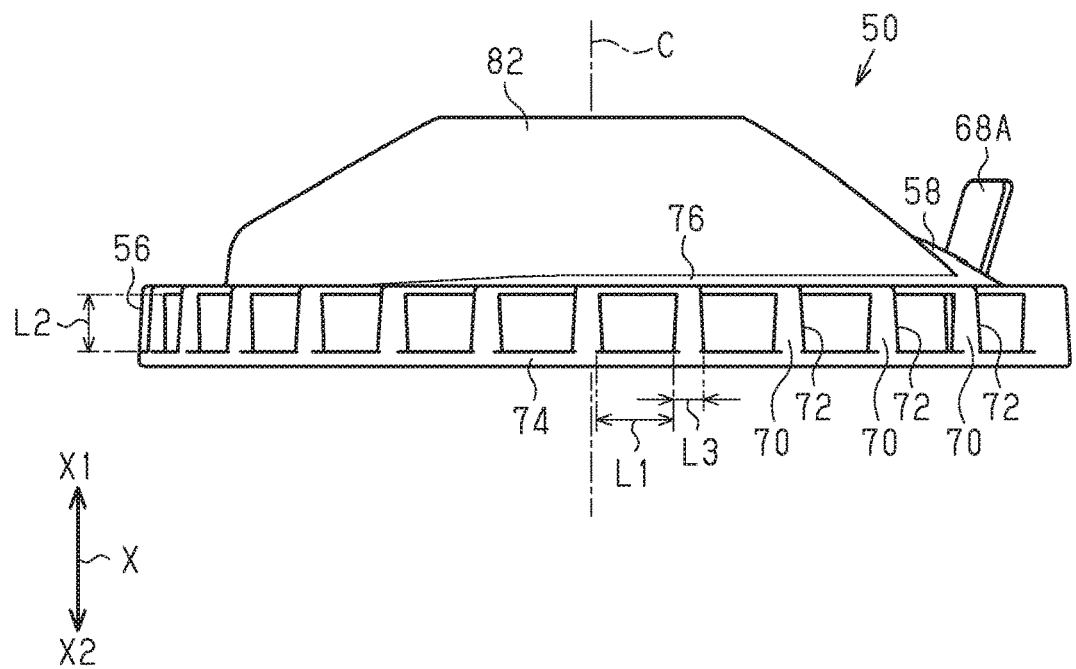
FIG. 7 is a plan view of the rotor cover shown in FIG. 1.

As shown in FIG. 7, the first openings 72 are provided between adjacent ones of the first pieces 70 in the circumferential direction of the rotor 40. The first openings 72 are defined by at least the first pieces 70 and the first connection piece 74. Each of the first openings 72 is rectangular and surrounded by adjacent ones of the first pieces 70, the first connection piece 74 and the second connection piece 76.

Each of the first openings 72 has a dimension L1 in the circumferential direction of the rotor 40. Each of the first pieces 70 has a dimension L3 in the circumferential direction of the rotor 40. The dimension L1 of each of the first openings 72 is greater than the dimension L3 of at least one of the first pieces 70. Each of the first openings 72 has a dimension L2 in the axial direction X of the rotor 40. The dimension L1 of each of the first openings 72 is greater than the dimension L2 of each of the first opening 72.

As shown in FIG. 2, the rotor 40 includes a side surface 40B opposite to the bicycle wheel 16. The side surface part 58 faces the side surface 40B, and is connected to the first pieces 70. The side surface part 58 covers the side surface 40B of the rotor 40. In one example, the side surface part 58 is connected to the first pieces 70 by the second connection piece 76. The side surface part 58 has the form of a disc that is partially cut away.

As shown in FIG. 5, the side surface part 58 includes at least two second pieces 78, a plurality of second openings 80, a third piece 82, a third connection piece 84 and a fourth connection piece 86. The second pieces 78 extend from the circumferential part 56 toward a portion facing the central portion of the rotor 40. Each of the second pieces 78 has the form of a strip that extends from the circumferential part 56 toward the center. The second piece 78 is inclined in the first direction X1 as the second piece 78 extends from a radially outer side of the rotor 40 toward the center rotational axis C.

The third connection piece 84 is continuous with the second connection piece 76. The third connection piece 84 is inclined in the first direction X1 as the third connection piece 84 extends from the second connection piece 76 toward the center rotational axis C. The third connection piece 84 is connected to adjacent ones of the second pieces 78. The third connection piece 84 has the form of a strip that extends in the circumferential direction of the 40.

The fourth connection piece 86 is located at a different location with respect to the third connection piece 84 in the radial direction of the rotor 40. The fourth connection piece 86 is connected to the second pieces 78. The fourth connection piece 86 is located closer to the center rotational axis C than the third connection piece 84 in the radial direction of the rotor 40. The fourth connection piece 86 has the form of a strip that extends in the circumferential direction of the rotor 40. The fourth connection piece 86 is parallel to the rotor 40. The coupling part 62 of the positioning portion 52 is coupled to a surface of the fourth connection piece 86 that faces the bicycle wheel 16.

The second openings 80 are provided between adjacent ones of the second pieces 78. At least two of the second openings 80 are arranged. The second pieces 78 and the second openings 80 are arranged next to one another in the circumferential direction of the rotor 40. Each of the second openings 80 is sectorial and surrounded by two adjacent ones of the second pieces 78, the third connection piece 84 and the fourth connection piece 86. The second opening 80 is smaller from the radially outer side toward the center. Each of the second openings 80 has a dimension L4, and each of the second piece 78 has a dimension L5 along a circumference about extending the axis C of the rotor 40. The dimension L4 of the second opening 80 is greater than the dimension L5 of at least one of the second pieces 78. The dimension L4 of each of the second opening 80 at the radially outermost position is greater than the largest dimension L5 of the second pieces 78. Each of the second openings 80 is greater in area than each of the first openings 72. Since the second pieces 78 are inclined, air is easily drawn into the second openings 80, which are located between adjacent ones of the second pieces 78, from the front of the bicycle 10.

Referring to FIG. 6, the third piece 82 covers the second openings 80. The third piece 82 is at least partially located below the bicycle frame 12. The third piece 82 covers the lowest one of the second openings 80. The third piece 82 is connected to the second pieces 78 at a rear side of the bicycle 10. The third piece 82 is connected to the third connection piece 84 at a lower side of the bicycle 10. The third piece 82 is not connected to the side surface part 58 at front and upper sides of the bicycle 10. This allows air to enter between the third piece 82 and the rotor 40 from the front of the bicycle 10. The third piece 82 includes a plurality of deflectors 82A at a side opposing the rotor 40. The deflectors 82A project toward the rotor 40. The deflectors 82A extend in the direction in which the bicycle 10 travels. Thus, the air, which enters between the third piece 82 and the rotor 40, is regulated and sent toward the rear of the bicycle 10 by the deflectors 82A and also guided toward the rotor 40 by a surface of the third piece 82 that faces the rotor 40.

Figure 4:
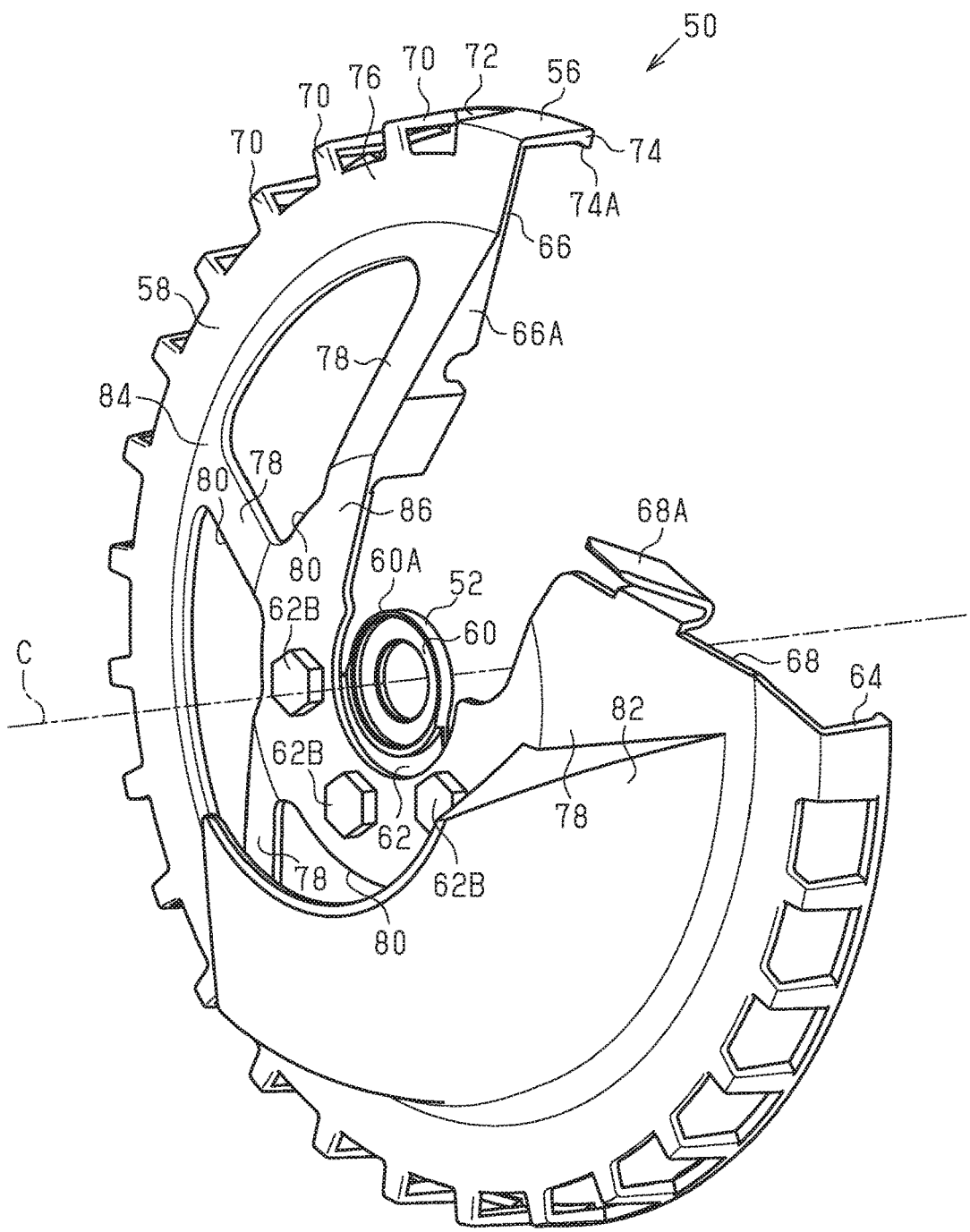
FIG. 4 is a perspective view of the rotor cover shown in FIG. 1 showing an outer side surface of the rotor cover.

As shown in FIGS. 1 and 4, the first edge 66 and the second edge 68 define a plurality of edges of the cutaway part 64. The first edge 66 faces the bicycle frame 12. The first edge 66 includes a restriction portion 66A. The restriction portion 66A extends in the axial direction X of the rotor 40. The restriction portion 66A is contactable with the bicycle frame 12 to restrict rotation of the rotor cover 50.

The second edge 68 faces the caliper 38. The second edge 68 includes a flexible portion 68A. The flexible portion 68A projects from the second edge 68 toward the caliper 38. The flexible portion 68A is bent by contacting the caliper 38. The flexible portion 68A has the form of a V-shaped thin plate. The flexible portion 68A is deformed by contacting the caliper 38 such that the V-shaped portion is narrowed.

The rotor cover 50 has the operations and advantages described below. The rotor cover 50 includes the first openings 72, which are arranged in the circumferential part 56. This limits contact of an object with the rotor 40 while efficiently drawing air flowing in the traveling direction of the bicycle 10 to an inner side of the rotor cover 50.

The rotor cover 50 includes at least three first pieces 70. This decreases the dimension L1 of each of the first openings 72 in the circumferential direction as compared to a case in which the rotor cover 50 includes two or fewer first pieces 70. Thus, contact of a small object with the rotor 40 is limited.

Modifications

The above description illustrates the embodiment of the rotor cover according to the present invention and is not intended to be restrictive. The embodiment of the rotor cover of the present invention can be modified as follows. Further, two or more of the modifications can be combined.

Figure 9:
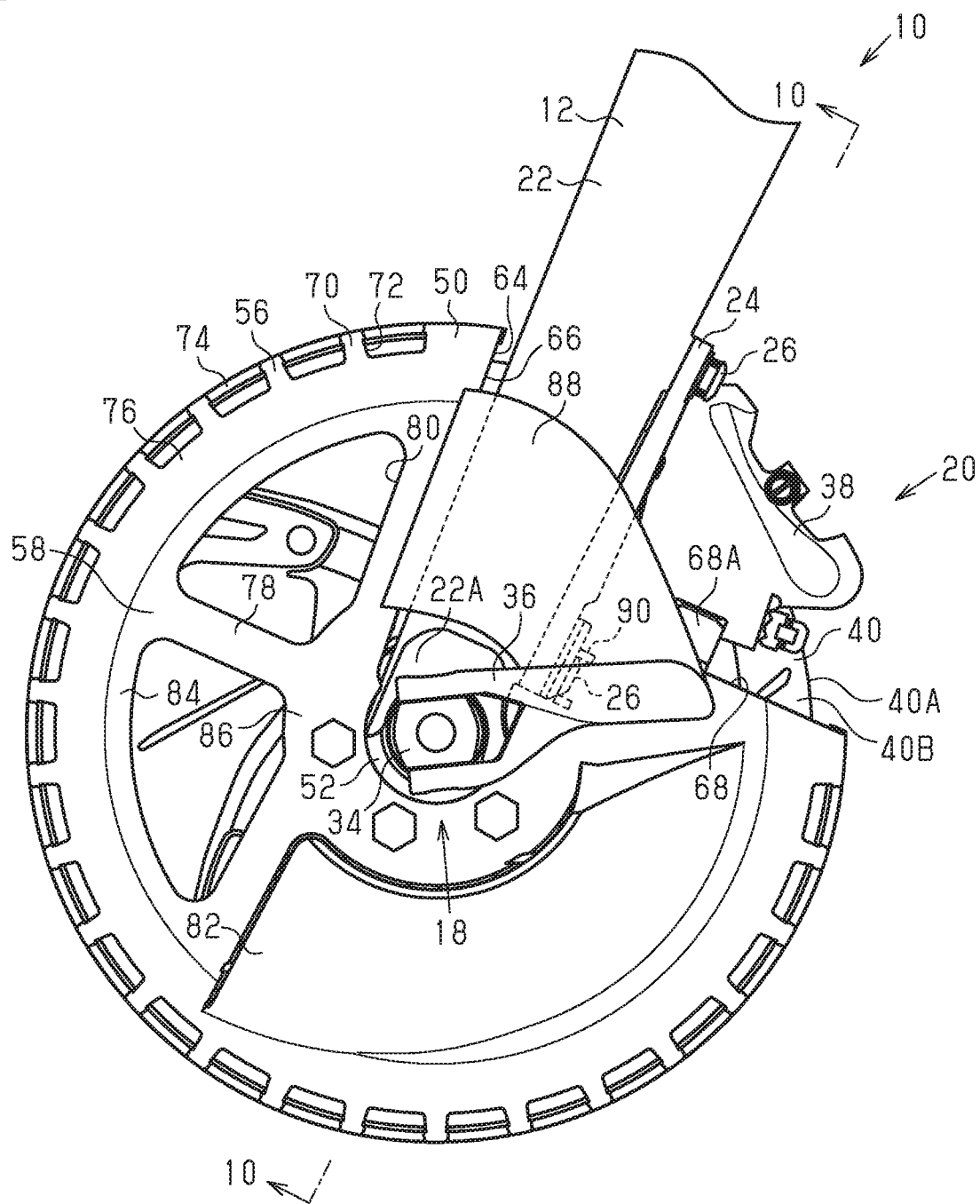
FIG. 9 is a side elevational view of a front portion of a bicycle that includes a rotor cover in accordance with a first modification.
Figure 10:
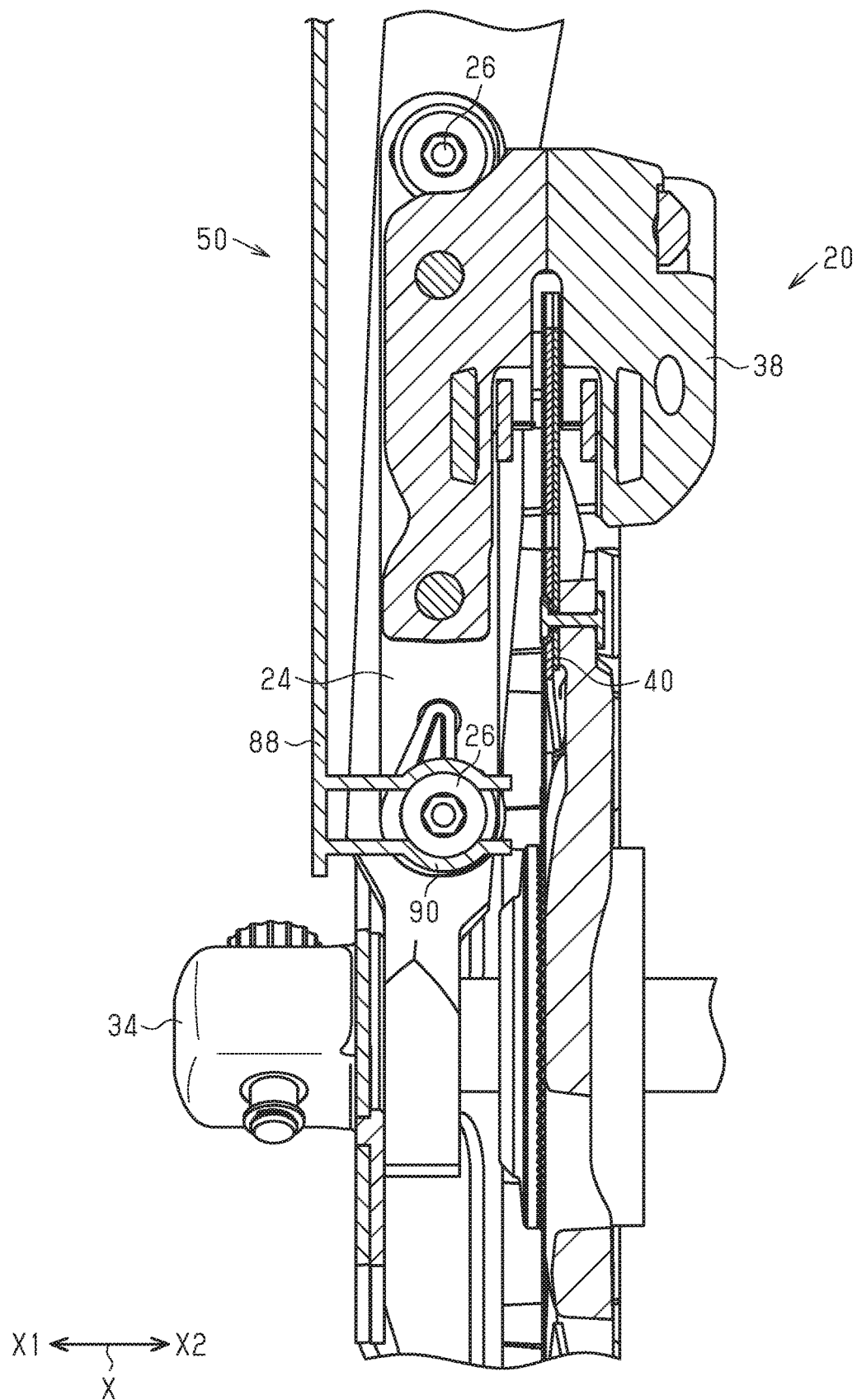
FIG. 10 is a cross-sectional view of the front portion of the bicycle taken along section line 10-10 in FIG. 9.

The positioning of the rotor cover 50 relative to the bicycle frame 12 can be changed or added as shown in FIGS. 9 and 10. FIG. 9 shows the rotor cover 50 further including an attachment portion 90, which is coupled to at least one of the bicycle frame 12 and the caliper 38. The rotor cover 50 includes a fourth piece 88. The fourth piece 88 is coupled to two of the second pieces 78 that are adjacent to each other by the cutaway part 64. The fourth piece 88 partially covers an end surface of the bicycle frame 12 that faces in the first direction X1. Also, the fourth piece 88 partially covers the caliper 38. As shown in FIG. 10, the attachment portion 90 is connected to a surface of the fourth piece 88 that is located at a side of the fourth piece 88 that faces in the second direction X2. Attachment portion 90 holds at least one of the bolt members 26 of the bicycle frame 12 by a snap-fit. More specifically, the attachment portion 90 includes a clip member configured to hold at least one of the bolt members 26 of the bicycle frame 12. In one example, the attachment portion 90 and the cover portion 54 include different materials with respect to one another. The attachment portion 90 can be formed integrally with the fourth piece 88. Alternatively, the attachment portion 90 can be formed separately from the fourth piece 88 and coupled to the fourth piece 88. In a case in which the rotor cover 50 includes the attachment portion 90, the positioning portion 52 can be omitted. In this case, the rotor cover 50 can be positioned relative to the bicycle frame 12 by the attachment portion 90.

Figure 11:
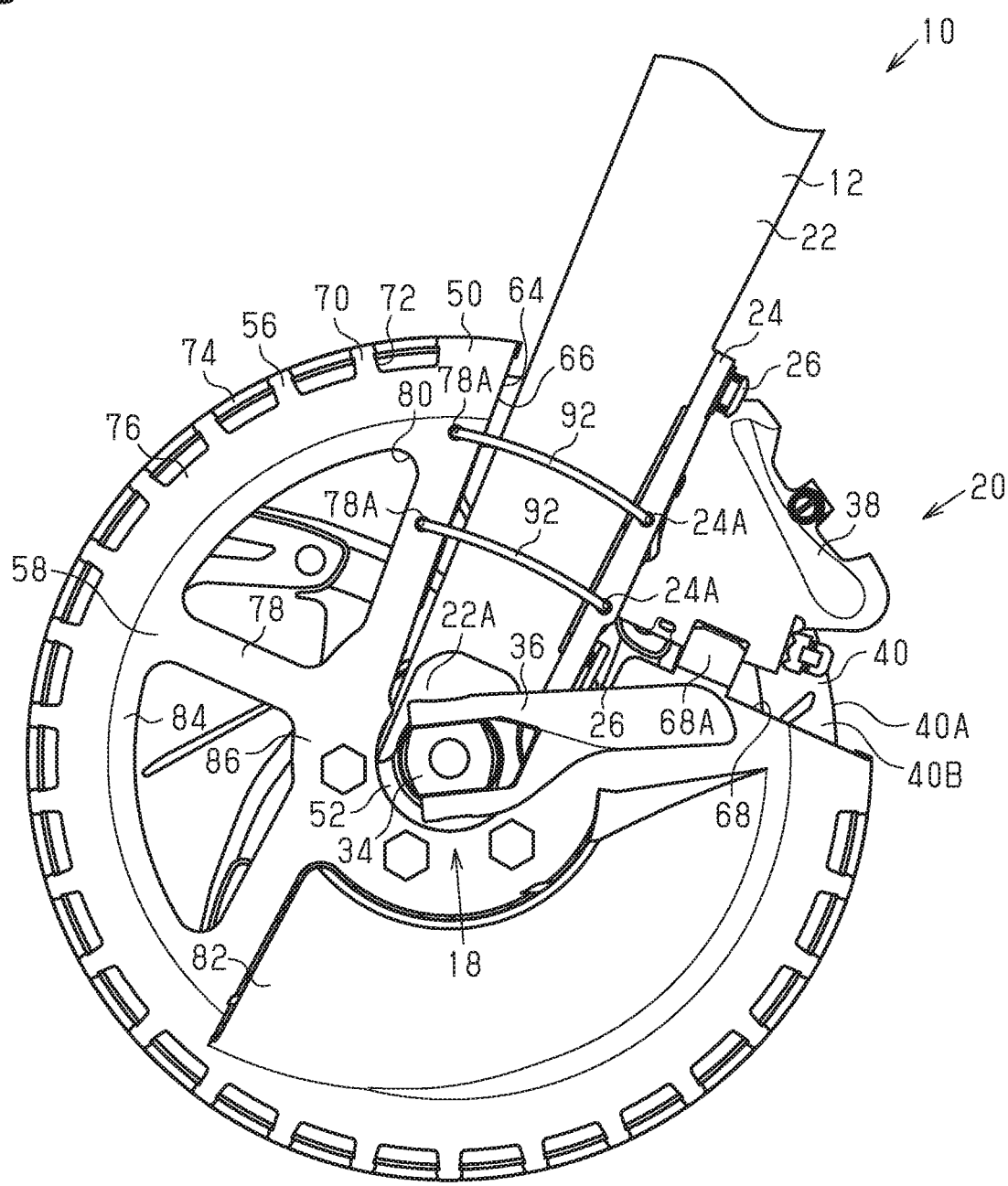
FIG. 11 is a side elevational view of a front portion of a bicycle that includes a rotor cover in accordance with a second modification.

The attachment portion 90 of the modification shown in FIGS. 9 and 10 can be changed or added to attachment portions 92 shown in FIG. 11. The attachment portions 92 shown in FIG. 11 include band members that are attachable to the bicycle frame 12. Examples of the band members include a tie-wrap, a rubber band, and a wire. The corresponding one of the second pieces 78 includes holes 78A, into which the band members are inserted. The mount portion 24 of the bicycle frame 12 includes holes 24A, into which the band members are inserted. In one example, the band members and the cover portion 54 include different materials with respect to one another. In a case in which the rotor cover 50 includes the attachment portions 92, the positioning portion 52 can be omitted. In this case, the rotor cover 50 can be positioned relative to the bicycle frame 12 by the attachment portions 92.

Figure 12:
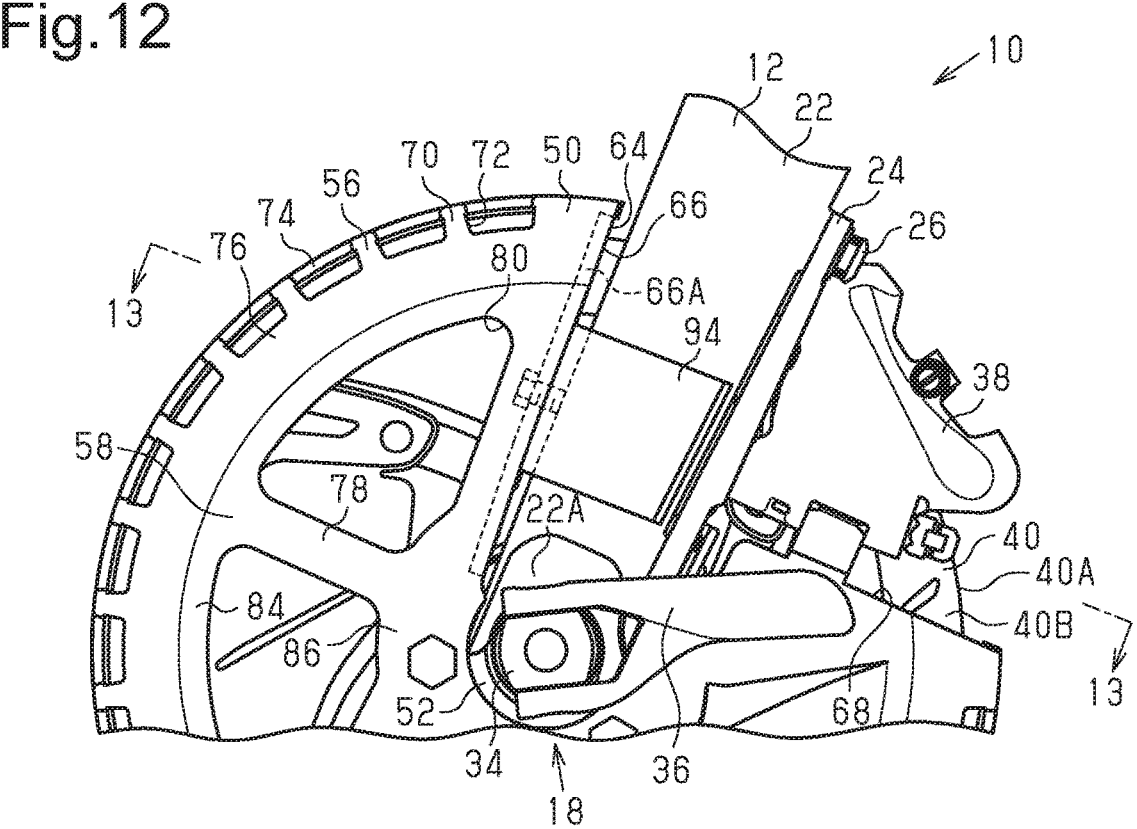
FIG. 12 is a side elevational view of a front portion of a bicycle that includes a portion of a rotor cover in accordance with a third modification.
Figure 13:
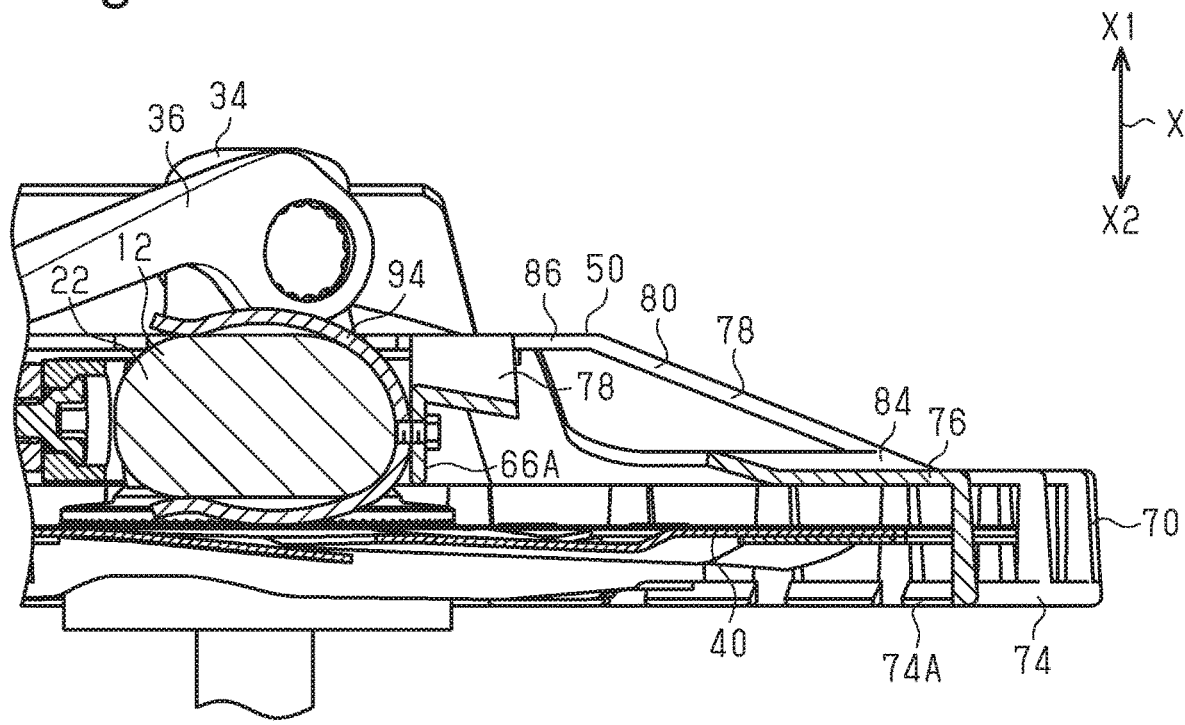
FIG. 13 is a cross-sectional view of the front portion of the bicycle taken along section line 13-13 in FIG. 12.

The attachment portion 90 of the modification shown in FIGS. 9 and 10 can be changed or added to an attachment portion 94 shown in FIGS. 12 and 13. In the rotor cover 50 shown in FIG. 12, the attachment portion 94 is coupled to the restriction portion 66A. The attachment portion 94 holds the frame body 22 of the bicycle frame 12 by a snap-fit. More specifically, the attachment portion 94 includes a clip member configured to hold the frame body 22 of the bicycle frame 12. In one example, the attachment portion 94 and the cover portion 54 include different materials with respect to one another. In a case in which the rotor cover 50 includes the attachment portion 94, the positioning portion 52 can be omitted. In this case, the rotor cover 50 can be positioned relative to the bicycle frame 12 by the attachment portion 94.

Figure 14:
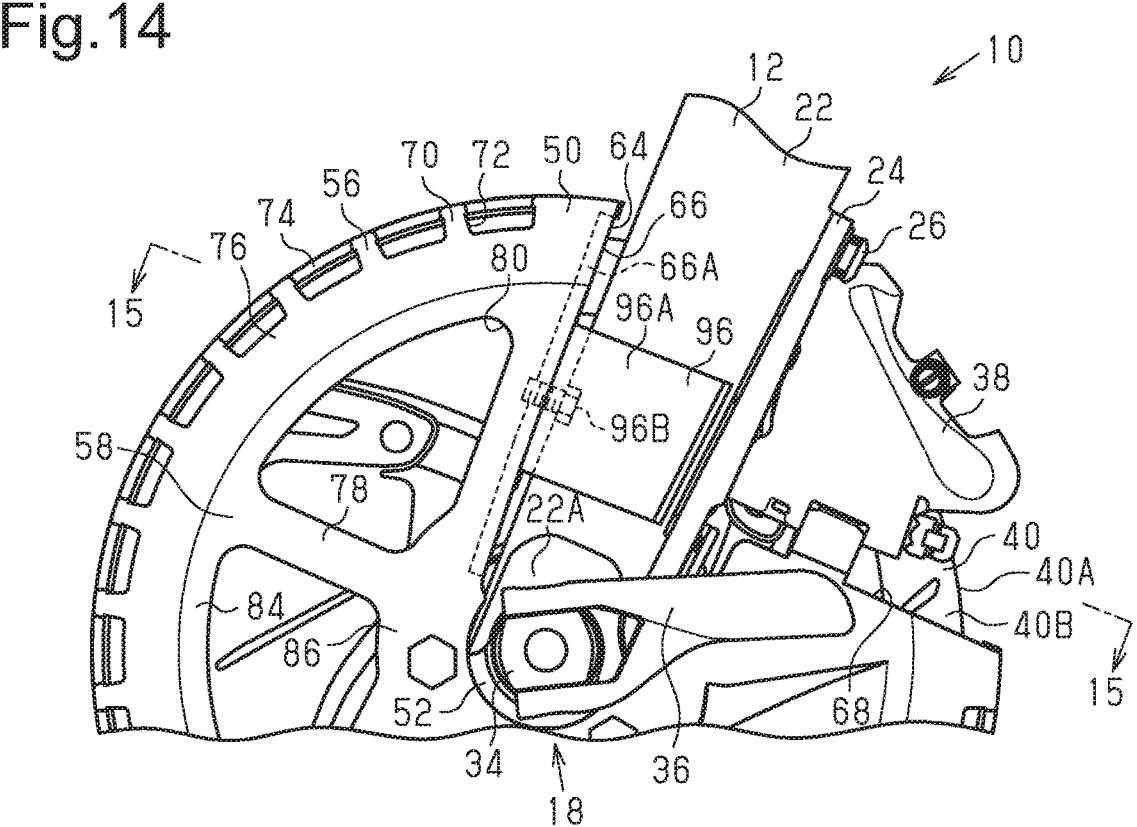
FIG. 14 is a side elevational view of a front portion of a bicycle that includes a portion of a rotor cover in accordance with a fourth modification.
Figure 15:
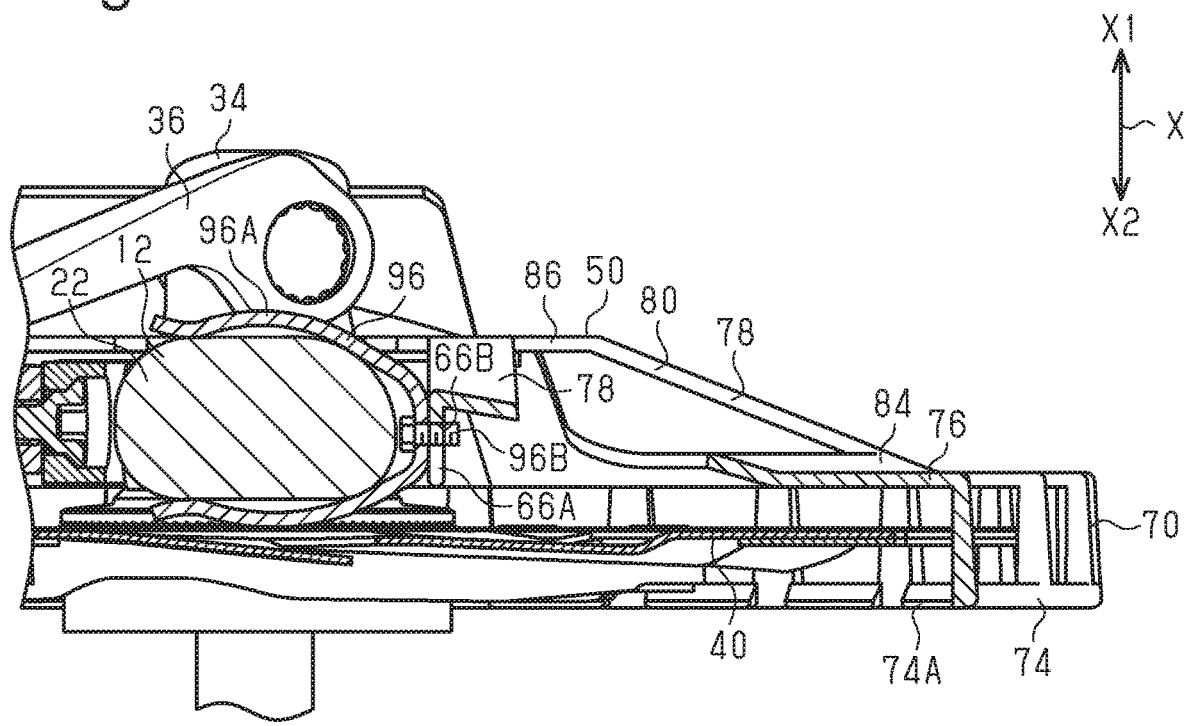
FIG. 15 is a cross-sectional view of the front portion of the bicycle taken along section line 15-15 in FIG. 14.

The attachment portion 90 of the modification shown in FIGS. 9 and 10 can be modified as shown in FIGS. 14 and 15. The bicycle frame 12 shown in FIG. 14 includes a mount portion 96. The mount portion 96 includes a curved part 96A, which holds the bicycle frame 12, and a projection 96B, which projects from the curved part 96A toward the restriction portion 66A. The restriction portion 66A of the rotor cover 50 includes a groove 66B. The rotor cover 50 is positioned relative to the bicycle frame 12 by fitting the projection 96B into the groove 66B. In this regard, the restriction portion 66A corresponds to an attachment portion that is attached to at least one of the bicycle frame 12 and the caliper 38. In one example, the restriction portion 66A is formed separately from the cover portion 54, and the restriction portion 66A and the cover portion 54 include different materials with respect to one another. In a case in which the rotor cover 50 includes the mount portion 96, the positioning portion 52 can be omitted. In this case, the rotor cover 50 can be positioned relative to the bicycle frame 12 by the restriction portion 66A.

The modification shown in FIGS. 14 and 15 can be modified so that the cover portion 54 is coupled to the mount portion 96 by a snap-fit, hook-and-loop fasteners, a magnet, or the like. In this case, the cover portion 54 and the mount portion 96 are configured to be coupled to each other.

Figure 16:
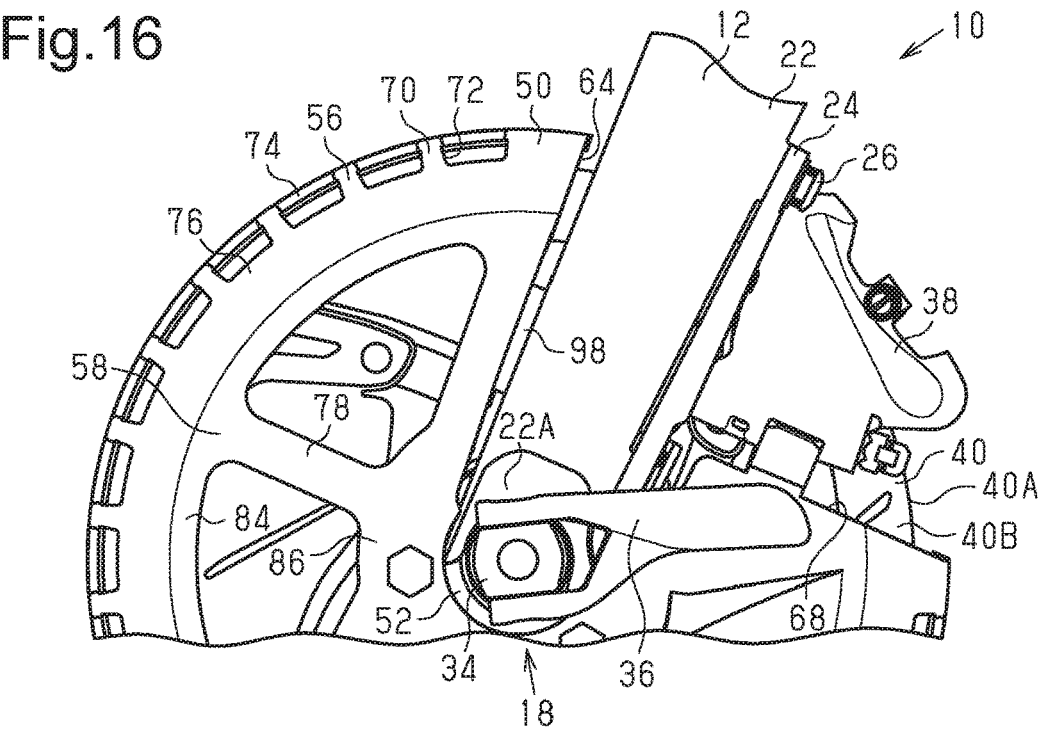
FIG. 16 is a side elevational view of a front portion of a bicycle that includes a portion of a rotor cover in accordance with a fifth modification.

The rotor cover 50 can be modified as shown in FIG. 16. The rotor cover 50 shown in FIG. 16 further includes an elastic portion 98. The elastic portion 98 is contactable with the cover portion 54 and at least one of the bicycle frame 12 and the caliper 38. In one example, the elastic portion 98 of the rotor cover 50 is coupled to the restriction portion 66A. The elastic portion 98 includes a rubber material. In another example, the elastic portion 98 includes a spring.

Figure 17:
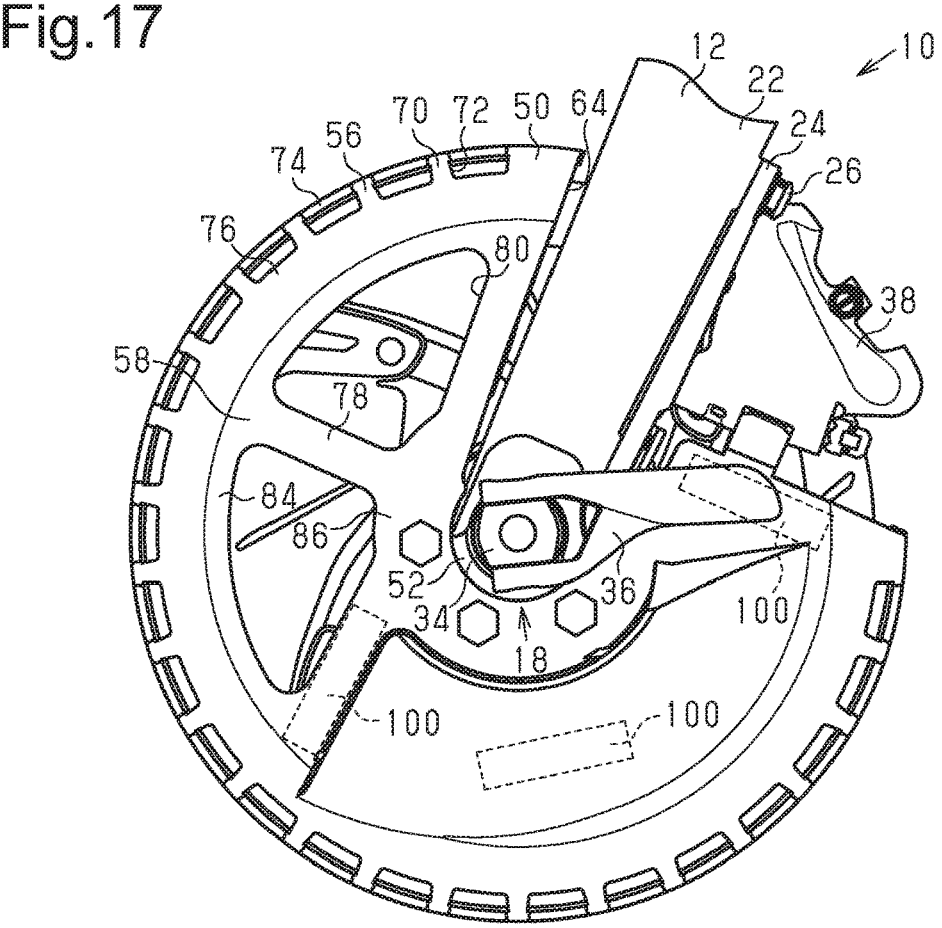
FIG. 17 is a side elevational view of a front portion of a bicycle that includes a portion of a rotor cover in accordance with a sixth modification.

The rotor cover 50 can be modified as shown in FIG. 17. The rotor cover 50 shown in FIG. 17 further includes a plurality of vibration absorption members 100, which are arranged on the cover portion 54. The vibration absorption members 100 include a rubber material. While the rotor cover 50 has a plurality of the vibration absorption members 100 in the illustrated embodiment, only one of the vibration absorption member 100 can be used. In one example, the vibration absorption members 100 are arranged on a surface of the rotor cover 50 that faces the second direction X2. In one example, the vibration absorption members 100 are concentrated on a lower portion of the rotor cover 50. In this case, the lower portion of the rotor cover 50 is heavier than an upper portion of the rotor cover 50. This allows the rotor cover 50 to be stably coupled to the bicycle frame 12 as compared to a case in which the upper portion of the rotor cover 50 is heavier than the lower portion. Additionally, since the lower portion of the rotor cover 50 is heavier than the upper portion, the rotation phase of the rotor cover 50 is easily set in coupling the rotor cover 50 to the bicycle frame 12.

The rotor cover 50 can be positioned relative to the rotor 40. The positioning portion 52 is positioned relative to the rotor 40. For example, a projection projecting in the first direction X1 is arranged in the vicinity of the center rotational axis C of the rotor 40. Splines are formed on the projection. The positioning portion includes splines that are fitted to the splines of the rotor 40.

The flexible portion 68A can face the bicycle frame 12. The flexible portion 68A is bent by contacting the bicycle frame 12. In this case, the second edge 68 is located at a position opposing the bicycle frame 12. The position opposing to the bicycle frame 12 corresponds to the position of the first edge 66 of the embodiment.

The restriction portion 66A can face the caliper 38. The restriction portion 66A, which extends in the axial direction X of the rotor 40, is contactable with the caliper 38 to restrict rotation of the rotor cover 50. In this case, the first edge 66 is located at a position opposing the caliper 38. The position opposing the caliper 38 corresponds to the position of the second edge 68 of the embodiment.

One or two first pieces 70 can be arranged. In this case, contact of an object with the rotor 40 is limited by increasing the dimension L3 of the first pieces 70 in the circumferential direction. Additionally, at least one of the first pieces 70 can be at least partially located below the center rotational axis C of the rotor 40 to limit contact of an object with the rotor 40 from a lower side.

The first connection piece 74 of the embodiment is connected to all of the first pieces 70. However, the first connection piece 74 can be modified and connected to only some of the first pieces 70. In this case, a plurality of first connection pieces 74 can be arranged.

The second connection piece 76 of the embodiment is connected to all of the first pieces 70. However, the second connection piece 76 can be modified and connected to only some of the first pieces 70. In this case, a plurality of second connection pieces 76 can be arranged.

The second connection piece 76 of the embodiment can be aligned with the rotor 40 or located closer to the bicycle wheel 16 than the rotor 40 in the axial direction X of the rotor 40.

The shape and dimensions of each of the first openings 72 can be changed. The dimension L1 of the first openings 72 in the circumferential direction of the rotor 40 can be smaller than the dimension L2 of the first openings 72 in the axial direction X of the rotor 40. The dimension L1 of the first openings 72 in the circumferential direction of the rotor 40 can be smaller than the dimension L3 of at least one of the first pieces 70 in the circumferential direction of the rotor 40. Decreases in the dimension L1 of the first openings 72 in the circumferential direction of the rotor 40 limit the contact of an object with the rotor 40. Increases in the dimension L1 of the first openings 72 in the circumferential direction of the rotor 40 allow air to be easily drawn to the inner side of the rotor cover 50. Additionally, each of the first openings 72 can be greater in area than each of the second openings 80.

Figure 18:
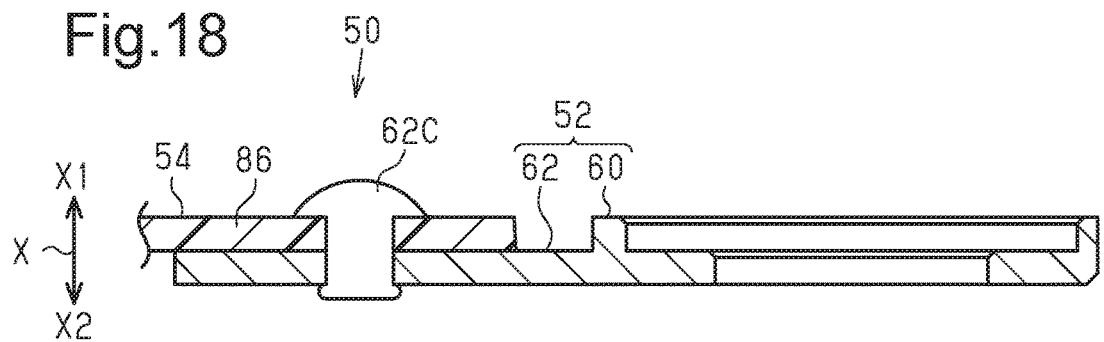
FIG. 18 is a side cross-sectional view of a bicycle a portion of a rotor cover in accordance with a seventh modification.
Figure 19:
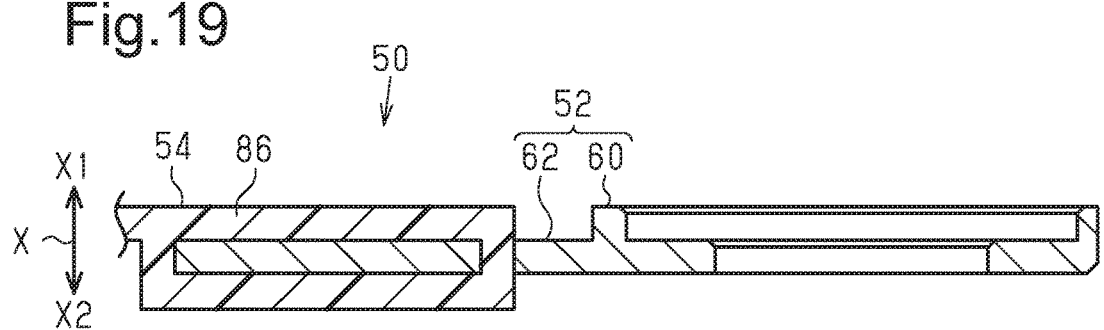
FIG. 19 is a cross-sectional view of a portion of a rotor cover in accordance with an eighth modification.

The third piece 82 can extend over all of the second openings 80. Alternatively, the third piece 82 can be omitted. The cover portion 54 can be coupled to the positioning portion 52 in a non-removable manner. In one example, as shown in FIG. 18, the cover portion 54 is coupled to the positioning portion 52 by a rivet 62C. In another example, as shown in FIG. 19, the cover portion 54 is coupled to the positioning portion 52 by insert molding. In another example, the cover portion 54 is coupled to the positioning portion 52 by swaging. Any process can be used as long as the relative movement of the cover portion 54 and the positioning portion 52 is restricted.

Figure 20:
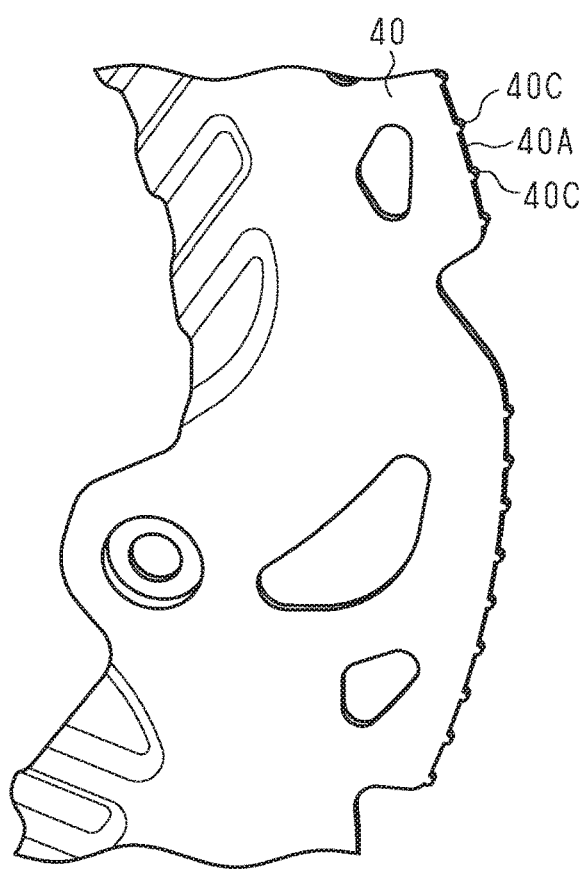
FIG. 20 is a perspective view of a portion on a disc brake rotor in accordance with a ninth modification.

The thickness H1 of the circumferential part can be smaller than the thickness H2 of the rotor 40. The rotor 40 can be modified as shown in FIG. 20. The rotor 40 shown in FIG. 20 includes a plurality of projections 40C, which are arranged on the circumferential edge 40A. The projections 40C are arranged in the circumferential direction of the rotor 40. Each of the projections 40C includes a curved circumferential end. Adjacent ones of the projections 40C are separated by a distance that is greater than a dimension of each of the projections 40C in the circumferential direction of the 40. The dimension of the projections 40C in the circumferential direction of the rotor 40 is smaller than the thickness H2 (refer to FIG. 2) of the rotor 40.

The above embodiment and modifications include the embodiments described below. For example, a first embodiment includes a bicycle disc brake rotor comprising a chamfered circumferential edge. In a second embodiment, the bicycle disc brake rotor of the first embodiment is configured so that the chamfered portion is a corner chamfer. A third embodiment includes a bicycle disc brake rotor comprising a circumferential edge that includes a plurality of projections. In a fourth embodiment, the bicycle disc brake rotor of the third embodiment is configured so that each of the projections includes a curved circumferential end.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down". "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle component. Accordingly, these directional terms, as utilized to describe the bicycle component should be interpreted relative to a bicycle in an upright riding position on a horizontal surface and that is equipped with the bicycle component. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. Finally, terms of degree such as "substantially", "about" and "approximately" as used herein mean an amount of deviation of the modified teen such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A rotor cover comprising:
   a positioning portion that is configured to be positioned relative to a bicycle frame or a disc brake rotor, the positioning portion including an annular part having a circumferential portion which projects in an axial direction of the rotor, the positioning portion further including a coupling part extending radially from the annular part, and
   a cover portion coupled to the positioning portion to cover the disc brake rotor,
   the cover portion and the positioning portion including different materials with respect to one another, the coupling part of the positioning portion being coupled to the cover portion.

2. The rotor cover according to claim 1, wherein the cover portion includes a resin material.

3. The rotor cover according to claim 1, wherein the positioning portion includes a metal material.

4. The rotor cover according to claim 3, wherein the positioning portion includes an aluminum alloy material.

5. The rotor cover according to claim 1, wherein the cover portion is coupled to the positioning portion in a non-removable manner.

6. The rotor cover according to claim 5, wherein the cover portion is formed integrally with the positioning portion.

7. The rotor cover according to claim 1, wherein the cover portion is coupled to the positioning portion in a removable manner.

8. The rotor cover according to claim 1, wherein the positioning portion is configured to be positioned relative to the bicycle frame to which a disc brake caliper is coupled.

9. The rotor cover according to claim 8, wherein the positioning portion is configured to be supported by a bicycle hub so that the positioning portion is attachable and removable together with the bicycle huh with respect to the bicycle frame.

10. The rotor cover according to claim 9, wherein a shaft member of the bicycle hub passes through the annular part of the positioning portion.

11. The rotor cover according to claim 8, further comprising:
    an attachment portion configured to be attached to at least one of the bicycle frame and the disc brake caliper.

12. The rotor cover according to claim 11, wherein the attachment portion includes a band member attachable to the bicycle frame.

13. The rotor cover according to claim 11, wherein the attachment portion includes a clip member configured to hold the bicycle frame.

14. The rotor cover according to claim 8, wherein the cover portion includes a first edge facing at least one of the bicycle frame and the disc brake caliper,
    the first edge includes a restriction portion that extends in an axial direction of the disc brake rotor, and
    the restriction portion is configured to be contactable with at least one of the bicycle frame and the disc brake caliper to restrict rotation of the rotor cover.

15. The rotor cover according to claim 8, wherein the cover portion includes a second edge facing at least one of the bicycle frame and the disc brake caliper when the rotor cover is positioned relative to the bicycle frame, and
    the second edge includes a flexible portion that is bent by contacting at least one of the bicycle frame and the disc brake caliper.

16. The rotor cover according to claim 8, further comprising:
    an elastic portion configured to be contactable with the cover portion and at least one of the bicycle frame and the disc brake caliper.

17. The rotor cover according to claim 1, further comprising:
    a vibration absorption member arranged on the cover portion.

18. The rotor cover according to claim 1, wherein the cover portion includes a circumferential part configured to at least partially cover a circumferential edge of the disc brake rotor at a radially outer side of the disc brake rotor, and a side surface part covering a side surface of the disc brake rotor that is opposite to a bicycle wheel, and
    the circumferential part is thicker than the disc brake rotor.

19. The rotor cover according to claim 1, wherein the coupling part includes at least one projection that projects from the annular part in the axial direction.

* * * * *